(12) United States Patent
Hu

(10) Patent No.: US 12,245,687 B2
(45) Date of Patent: Mar. 11, 2025

(54) SIGNAL DRIVEN LIGHT-EMITTING E-SPORTS TABLE

(71) Applicant: DESIGNA INC., Guangdong (CN)

(72) Inventor: Yajun Hu, Guangdong (CN)

(73) Assignee: DESIGNA INC., Guangdong (CN)

( * ) Notice: Subject to any disclaimer, the term of this patent is extended or adjusted under 35 U.S.C. 154(b) by 192 days.

(21) Appl. No.: 18/008,276

(22) PCT Filed: Jul. 21, 2020

(86) PCT No.: PCT/CN2020/103172
§ 371 (c)(1),
(2) Date: Dec. 5, 2022

(87) PCT Pub. No.: WO2021/253559
PCT Pub. Date: Dec. 23, 2021

(65) Prior Publication Data
US 2023/0284774 A1    Sep. 14, 2023

(30) Foreign Application Priority Data

Jun. 15, 2020   (CN) .......................... 202010544195.1

(51) Int. Cl.
*H05B 47/105*  (2020.01)
*A47B 13/12*   (2006.01)
(Continued)

(52) U.S. Cl.
CPC .............. *A47B 13/12* (2013.01); *A63F 13/98* (2014.09); *F21V 33/0012* (2013.01);
(Continued)

(58) Field of Classification Search
CPC . A47B 13/12; A47B 2220/0077; A47B 37/00; A47B 13/02; A47B 13/08;
(Continued)

(56) References Cited

U.S. PATENT DOCUMENTS 9,759,368 B1 *  9/2017  Parks ................... F16M 11/046
10,270,618 B1 *  4/2019  Saes ....................... H05B 47/19
(Continued)

FOREIGN PATENT DOCUMENTS

AU     2020101422 A4     8/2020
CN     105831983 A       8/2016
(Continued)

*Primary Examiner* — Ryan Jager
(74) *Attorney, Agent, or Firm* — Muncy, Geissler, Olds & Lowe, P.C.

(57) ABSTRACT

The present disclosure provides a signal driven light-emitting e-sports table, comprising a table top; a signal input device for receiving an signal input; and a controller; wherein the table top is provided with a light-emitting device; an input of the controller is connected with the signal input device; an output of the controller is in communication with the light-emitting device though signaling; and the light-emitting device is controlled to emit light based on the signal input. The signal driven light-emitting e-sports table according to the present disclosure may provide a light-emitting effect according to the signal input, and may control the change of the light-emitting mode of the table top, to provide a variable light-emitting function for the table top, and to provide a light source for the e-sports players, and can provide the function of lighting. It is especially suitable for use as a sports platform in e-sports.

12 Claims, 9 Drawing Sheets

(51) Int. Cl.
  *A63F 13/98* (2014.01)
  *F21V 33/00* (2006.01)
  *H05B 47/19* (2020.01)
  *F21W 131/301* (2006.01)

(52) U.S. Cl.
  CPC ........... *H05B 47/105* (2020.01); *H05B 47/19* (2020.01); *A47B 2220/0077* (2013.01); *F21W 2131/301* (2013.01)

(58) Field of Classification Search
  CPC ... A47B 97/00; A47B 2200/008; A63F 13/98; A63F 13/215; A63F 13/235; A63F 13/90; F21V 33/0012; F21V 23/003; F21V 33/008; H05B 47/105; H05B 47/19; H05B 47/115; H05B 47/12; H05B 47/165; H05B 45/10; H05B 45/20; F21W 2131/301; Y02B 20/40; H04R 1/08; H04R 1/028; F21S 10/00; H04W 4/80; F21Y 2107/10; F21Y 2115/10
  USPC ........................................................ 315/307
  See application file for complete search history.

(56) References Cited

U.S. PATENT DOCUMENTS

| | | | |
|---|---|---|---|
| 11,287,124 B2* | 3/2022 | Maderic | F21V 33/0008 |
| 11,532,216 B2* | 12/2022 | Houle | G08B 5/006 |
| 2015/0300627 A1* | 10/2015 | Wang | F21V 33/0012 362/127 |
| 2019/0063666 A1 | 2/2019 | Hoang | |
| 2019/0242562 A1* | 8/2019 | Chien | F21V 23/023 |
| 2019/0293278 A1* | 9/2019 | McNae | A63F 13/285 |
| 2020/0011959 A1* | 1/2020 | Abou-Rizk | G01S 5/0289 |
| 2021/0388979 A1* | 12/2021 | Maderic | F21V 33/0008 |
| 2023/0225501 A1* | 7/2023 | Hu | A47B 13/08 108/23 |
| 2023/0284774 A1* | 9/2023 | Hu | H04R 1/028 |

FOREIGN PATENT DOCUMENTS

| | | |
|---|---|---|
| CN | 105935199 A | 9/2016 |
| CN | 205915864 U | 2/2017 |
| CN | 208190978 U | 12/2018 |
| CN | 110148287 A | 8/2019 |
| CN | 110297547 A | 10/2019 |
| CN | 110664114 A | 1/2020 |

* cited by examiner

SIGNAL DRIVEN LIGHT-EMITTING E-SPORTS TABLE

TECHNICAL FIELD

The present disclosure relates to the technical field of e-sports tables, and more particularly, to a signal driven light-emitting e-sports table.

TECHNICAL BACKGROUND

E-sports (Electronic Sports) is a sports event of video game competitions that reach a "competitive" level. E-sports is the use of electronic devices as sports equipment to conduct intellectual competition between people. With the development and the rise of e-sports, more and more people have joined e-sports. Therefore, the demand for e-sports products increases continuously with the expansion of e-sports teams.

At this stage, in order to facilitate users' operation and experience in e-sports, related e-sports products have appeared on the market e-sports chairs, e-sports earplugs, e-sports racks, etc. As a practical tool, the e-sports table has a sense of high technology, conforms to ergonomic design, and is beautiful and stylish. It allows e-sports enthusiasts to play e-sports games more comfortably. It is widely used in various Internet cafes and residences of e-sports enthusiasts. In real life, it has a large market.

At present, most existing e-sports tables do not have a light-emitting function, which results in a more monotonous visual effect, and not having a cool appearance. They do not suit to the characteristics of the e-sports industry, and as a result the user experience is not very good. At the same time, most e-sports tables do not have a light-emitting function and cannot provide a light source for e-sports players in a dim environment. This affects the operation of the e-sports players. In order to achieve an e-sports table with better technological effect, there are currently e-sports tables that use a plate that can emit light (that is, a light-emitting board) to improve aesthetics and viewing. However, in the current market, there is a problem that the light-emitting effect of the light-emitting panel is often not ideal in the dark, the lighting effect is monotonous, and it cannot fulfil the needs of e-sports enthusiasts and e-sports players.

SUMMARY OF THE INVENTION

The purpose of this disclosure is to overcome the shortcomings and deficiencies in the prior art, and to provide a signal driven light-emitting e-sports table. The e-sports table can provide a light-emitting effect according to an signal input, to provide a light source for the e-sports players, and can provide the function of lighting. It is especially suitable for use as a sports platform in e-sports.

In order to achieve the above purpose, the present disclosure offers the following technical solutions: A signal driven light-emitting e-sports table, comprising a table top; a signal input device for receiving an signal input; and a controller; wherein the table top is provided with a light-emitting device; an input of the controller is connected with the signal input device; an output of the controller is in communication with the light-emitting device though signaling; and the light-emitting device is controlled to emit light based on the signal input.

In the above solution, the e-sports table of the present disclosure may trigger and control the light-emitting mode of the light-emitting device according to the signal input of the signal input device to provide a variable light-emitting function for the table top, to provide a light source for the e-sports players, and can provide the function of lighting. In addition, this method can increase the sense of technology of the table top and promote the e-sports atmosphere. It is especially suitable for use as a sports platform in e-sports. In addition, the lighting method and lighting frequency of the light-emitting device can be adjusted according to the size and frequency of the signal input of the signal input device. Through the change of the signal input, the light changes accordingly to further increase the coolness and technological sense of the e-sports table.

In one form, the signal input device is in one of the following forms:

(a) the signal input device comprises an audio signal sampling module, a vibration sensing sampling module and a microphone signal sampling module;

(b) the signal input device comprises an audio signal sampling module, a vibration sensing sampling module or a microphone signal sampling module;

(c) the signal input device comprises an audio signal sampling module and a microphone signal sampling module; or the signal input device comprises a vibration sensing sampling module and a microphone signal sampling module;

(d) the signal input device comprises an audio signal sampling module and a vibration induction sampling module.

When the signal input device is an audio signal sampling module, the lighting frequency and lighting intensity etc. of a light-emitting mode of the light-emitting device may be changed according to the strength of the signal input of the audio signal sampling module, to produce responsive lighting. The e-sports table may combine lighting and music elements to produce an interactive effect. The e-sports table changes the lighting effect of the table top according to the rhythm and changes of the music rhythm, so that the e-sports players may also enjoy the lighting effect while listening to the music, which may satisfy the e-sports experience.

When the signal input device is a vibration sensing sampling module, the lighting frequency and lighting intensity etc. of a light-emitting mode of the light-emitting device may be changed according to the size and frequency of the input of the vibration-sensing sampling module signal based on the magnitude and frequency of striking force against the table top, to produce responsive lighting. The e-sports table may combine lighting and vibration elements to produce an interactive effect, so that the e-sports players may also enjoy the lighting effect while playing e-sports games, which may satisfy the e-sports experience.

When the signal input device is a microphone signal sampling module, the lighting frequency and lighting intensity etc. of a light-emitting mode of the light-emitting device may be changed according to the signal input received by the microphone signal sampling module based on the strength of external environment music or voice detected by a microphone, to produce responsive lighting. The e-sports table may combine lighting and voice elements of the e-sports players to produce an interactive effect. The e-sports table changes the lighting effect of the table top according to the rhythm and changes of environment music or voice, so that the e-sports players may also enjoy the lighting effect while listening to the music, which may satisfy the e-sports experience.

In one form, the present disclosure further comprises a saving module for saving a last used light-emitting mode of the light-emitting device; and a voltage conversion module for supplying power; wherein an input of the saving module is connected with the input of the controller; and the voltage conversion module is connected to the controller. The saving module may save the last used light-emitting mode of the light-emitting device, for example the lighting color, lighting frequency, lighting brightness etc.

In one form, the present disclosure further comprises a Bluetooth module for a signal connection between an external remote controller and the controller; the Bluetooth module is connected to the input of the controller; wherein the external remote control is a mobile phone, a tablet or a smart terminal. The external remote control may be a commonly used remote control on the market, or it can be a mobile phone, smart terminal or tablet with APP software installed. The e-sports table may use the external remote control to control remotely the on-off switch of the light-emitting device, change the lighting color, and change the light-emitting mode.

In one form, the present disclosure further comprises an external terminal module for switching a signal input mode;
when the signal input device is in form (a), the external terminal module is respectively connected to the audio signal sampling module and the controller;
when the signal input device is in form (c), the external terminal module is respectively connected to the vibration sensing sampling module and the controller;
the controller blocks a signal input of the microphone signal sampling module when detecting a signal of the external terminal module.

When the controller detects the signal of the external terminal module, the signal input of the microphone signal sampling module is blocked. At this time, the controller detects the signal input of the audio signal sampling module and/or the signal input of the vibration sensing sampling module, to controls the light-emitting device. When the signal input device is in form (a), in actual application, the priority levels of the signal input of the audio signal sampling module and the signal input of the vibration sensing sampling module may be set in the programming of the controller according to the requirements. The controller may control the light-emitting device based on the signal input according to the priority level. When no priority signal input is detected, the light-emitting device is controlled according to another received signal input. When the controller does not detect a signal of the external port module, the controller will control the light-emitting device according to the signal input of the microphone signal sampling module. In this way, the signal input mode can be switched, so that the e-sports players may select different signal input modes according to their preferences or needs to control the table top to emit light.

In one form, the vibration sensing sampling module is formed by connecting a vibration sensor for sensing a vibration of the table top, a control chip connected to the controller, and a peripheral circuit; and the vibration sensor is connected to the table top.

In one form, the audio signal sampling module is formed by connecting an audio acquisition circuit, a control chip connected to the controller, and a peripheral circuit.

In one form, the microphone signal sampling module is formed by connecting a microphone, an amplifier circuit and a peripheral circuit.

In one form, the table top comprises a frame body, a light-transmitting plate, and a shielding plate for preventing light leakage; the shielding plate is provided inside the frame body; the light-transmitting plate covers an upper end of the frame body; a space is provided between the light-transmitting plate and the shielding plate; the light-emitting device is provided within the space, and a light of the light-emitting device is emitted through the light-transmitting plate.

In one form, the table top comprises a frame body, at least one light-emitting device, a light-transmitting plate, and at least one mounting rack for mounting the at least one light-emitting device; wherein the number of the at least one mounting rack is the same with the number of the at least one light-emitting device; the at least one mounting rack is detachably connected to the frame body and is located inside the frame body; the light-transmitting plate covers an upper end of the frame body; each of the at least one light-emitting device is mounted on one of the at least one mounting rack; and a light of the light-emitting device is emitted through the light-transmitting plate.

Compared with the prior art, the present disclosure has the following advantages and beneficial effects: The signal driven light-emitting e-sports table according to the present disclosure may provide a light-emitting effect according to the signal input, and may control the change of the light-emitting mode of the table top, to provide a variable light-emitting function for the table top, and to provide a light source for the e-sports players, and can provide the function of lighting. It is especially suitable for use as a sports platform in e-sports.

Among them, 1 is the frame body, 2 is the LED light strip, 3 is the light-transmitting plate, 3.1 is the light-transmitting layer, 3.2 is the light-shielding paint layer, 4 is the shielding plate, 5 is the control unit, 6 is the power adapter, 7 is the reinforcement rod, 8 is the table leg, 9 is the base, 10 is the adjustable leg, 11 is the headphone holder, 12 is the cup holder, 13 is the controller, 13.1 is the first input terminal, 13.2 is the second input terminal, 13.3 is the third input terminal, 13.4 is the fourth input terminal, 14 is the saving module, 15 is the voltage conversion module, 16 is the Bluetooth module, 17 is the audio signal sampling module, 18 is the vibration sensing sampling module, 18.1 is the vibration sensor, 19 is the microphone signal sampling module, 19.1 is the microphone, 20 is the external terminal module, 21 is the control chip, 22 is the light driver module, 23 is the light-emitting body, 24 is the mounting rack, 24.1 is the frame, 24.2 is the mounting groove, 24.3 is the insertion piece, 25 is the light guide plate, 26 is the mounting seat, 26.1 is the insertion hole, 27 is the decorative layer, 28 is the decorative cover, 29 is the cable organizer.

DESCRIPTION

The present disclosure will be described in further detail below with reference to the figures and specific embodiments.

FIRST EMBODIMENT

Figure 1:
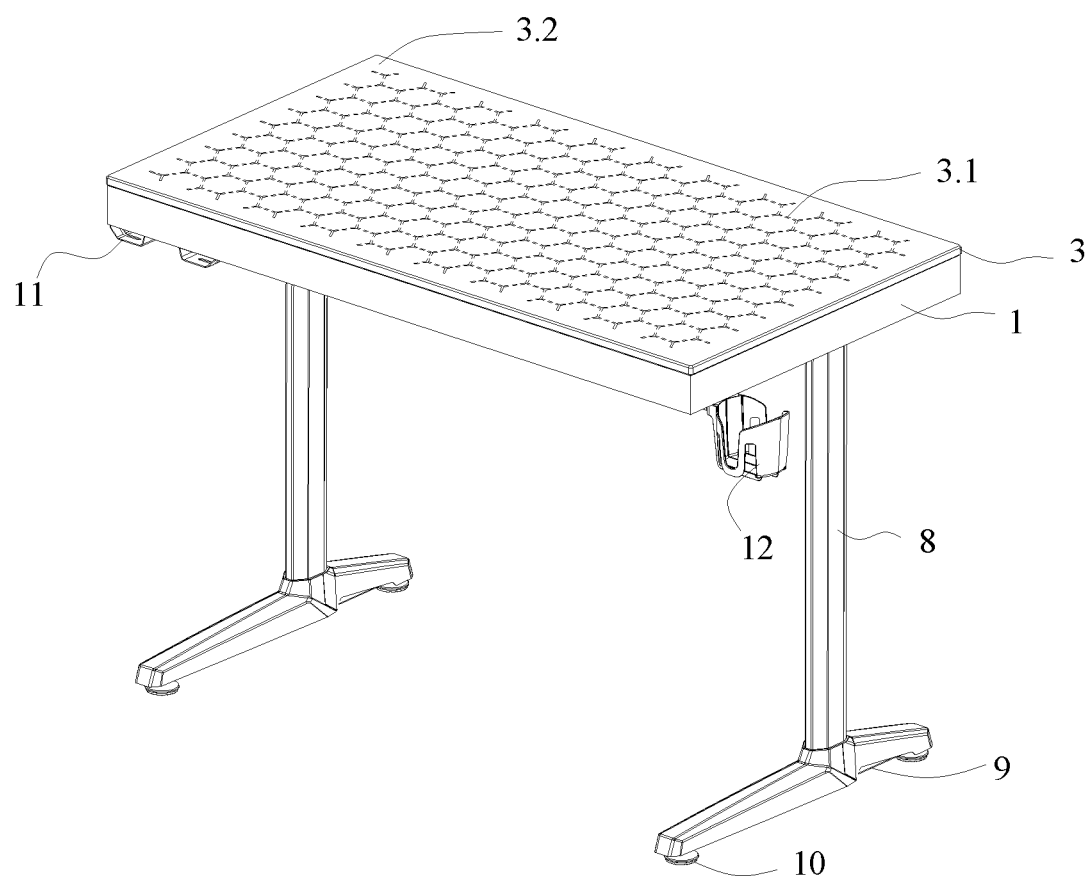
FIG. 1 is an illustrative diagram of the e-sports table in the first embodiment.
Figure 2:
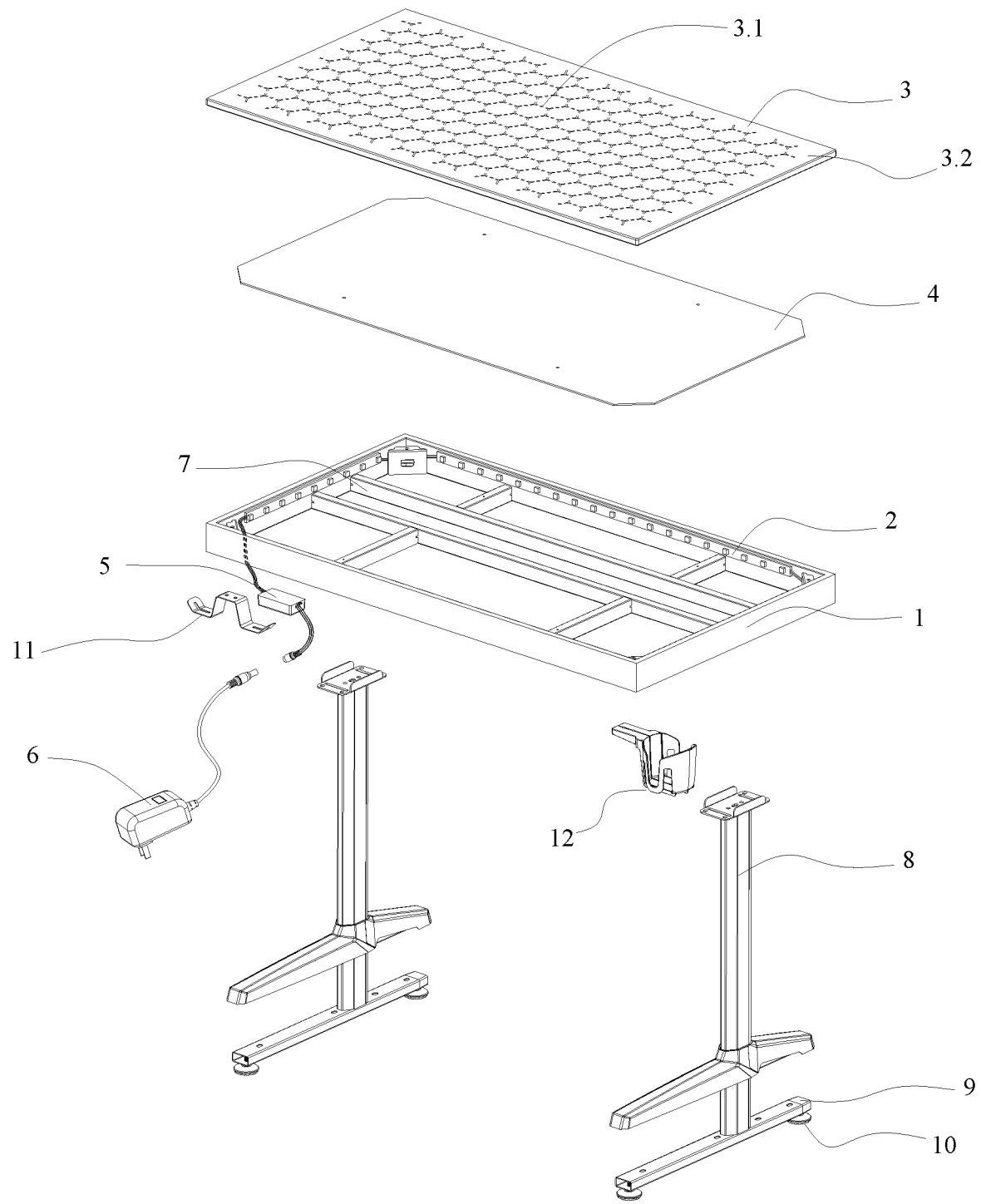
FIG. 2 is an exploded view of the e-sports table in the first embodiment.
Figure 3:
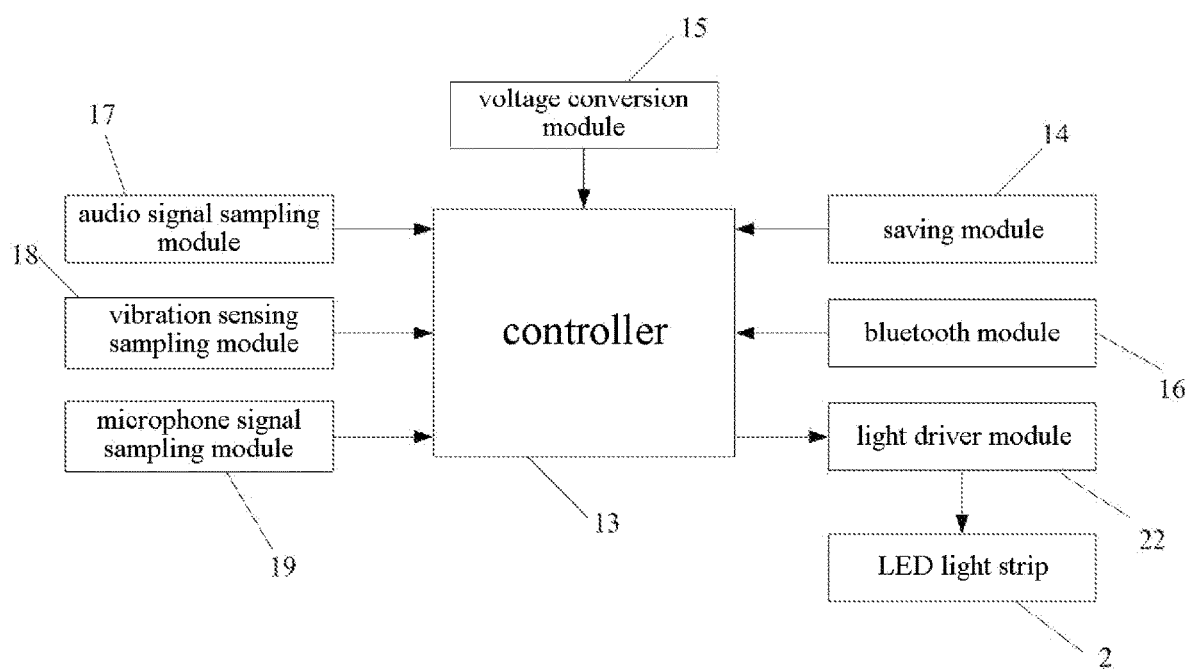
FIG. 3 is an illustrative diagram of modules of the e-sports table in the first embodiment.
Figure 4:
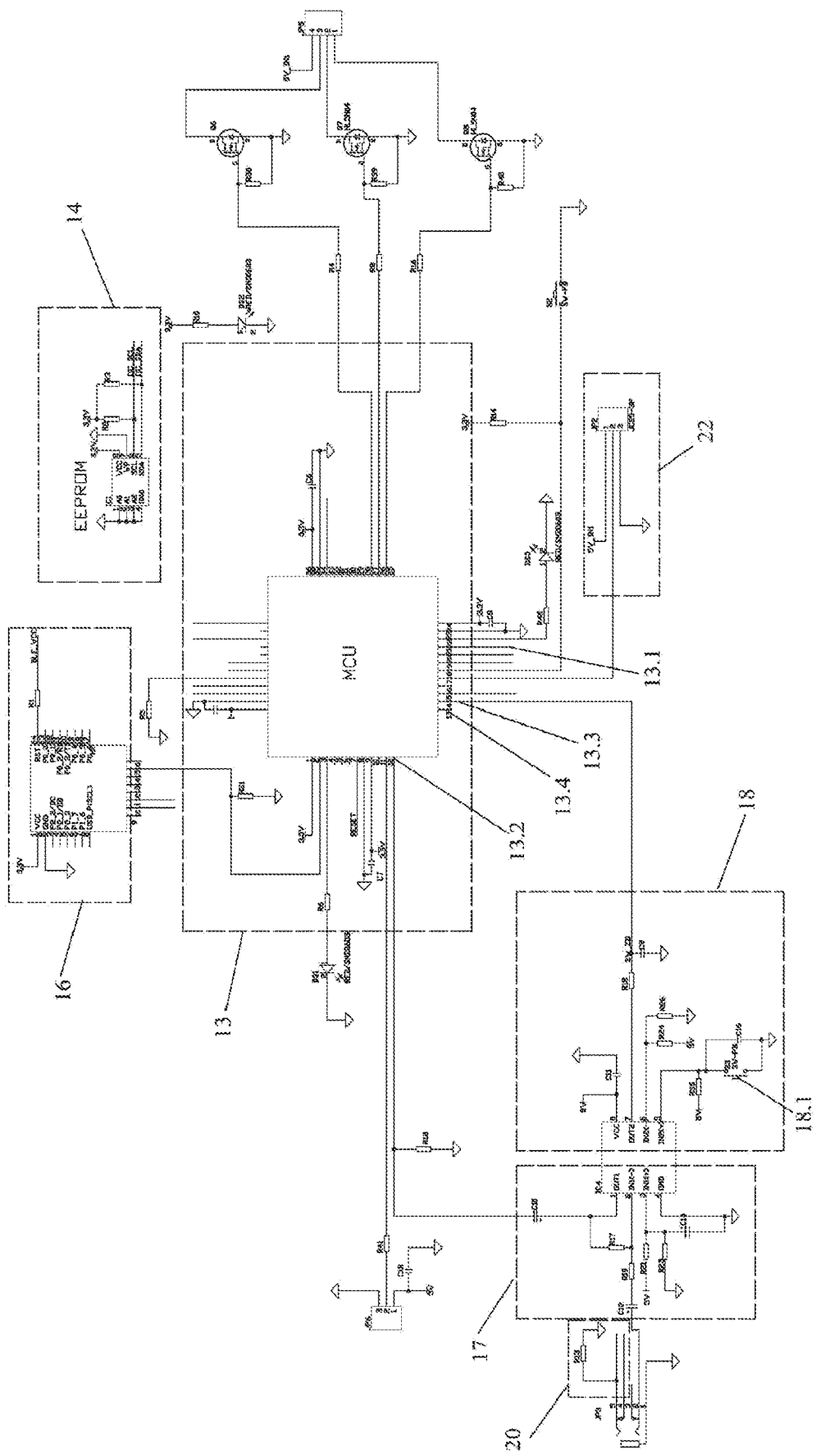
FIG. 4 is a connection circuit diagram of a controller, an audio signal sampling module, a vibration sensing sampling module, a Bluetooth module, a saving module, and a light-emitting device in the first embodiment.
Figure 5:
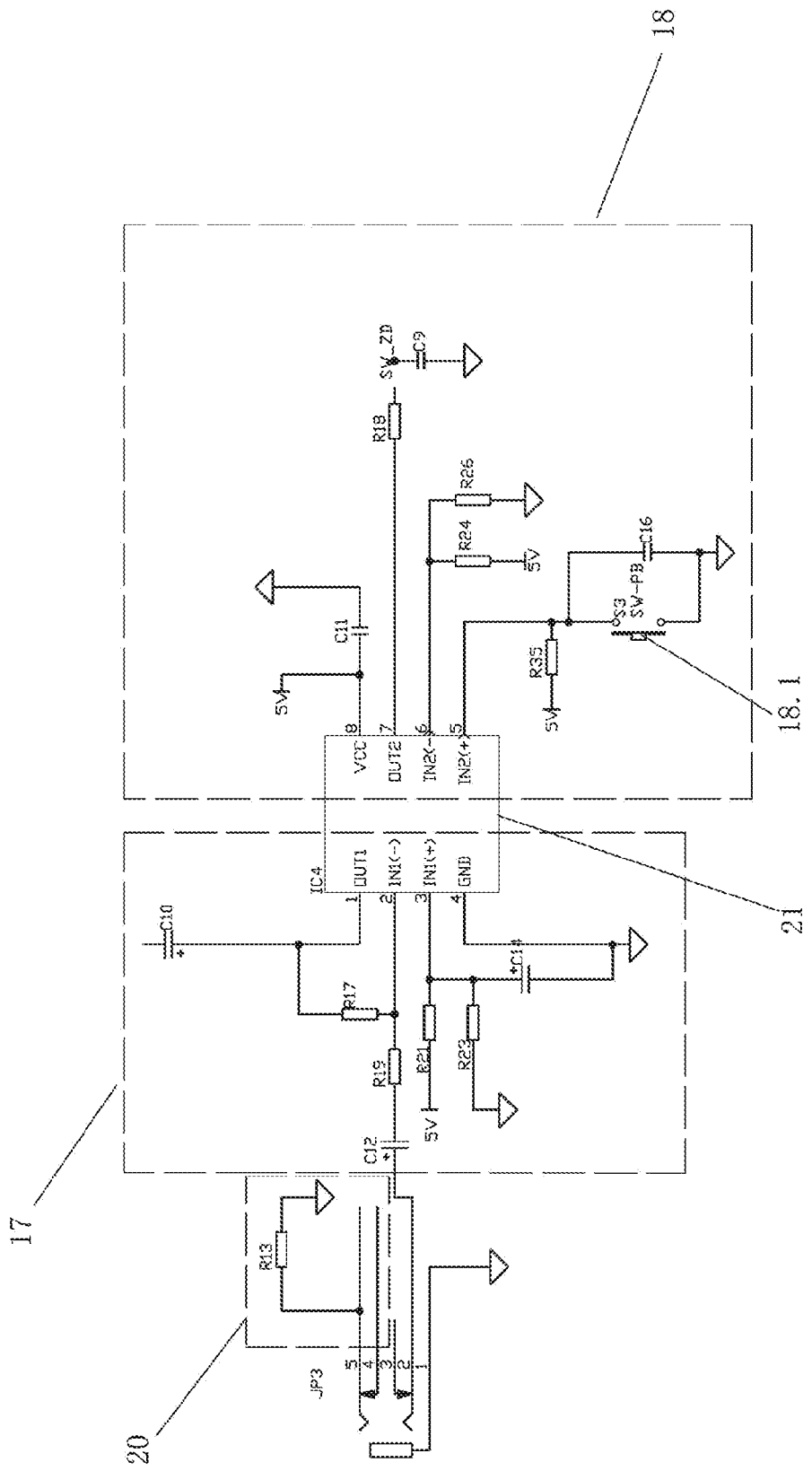
FIG. 5 is a connection circuit diagram of the audio signal sampling module and the vibration sensing sampling module in the first embodiment.
Figure 6:
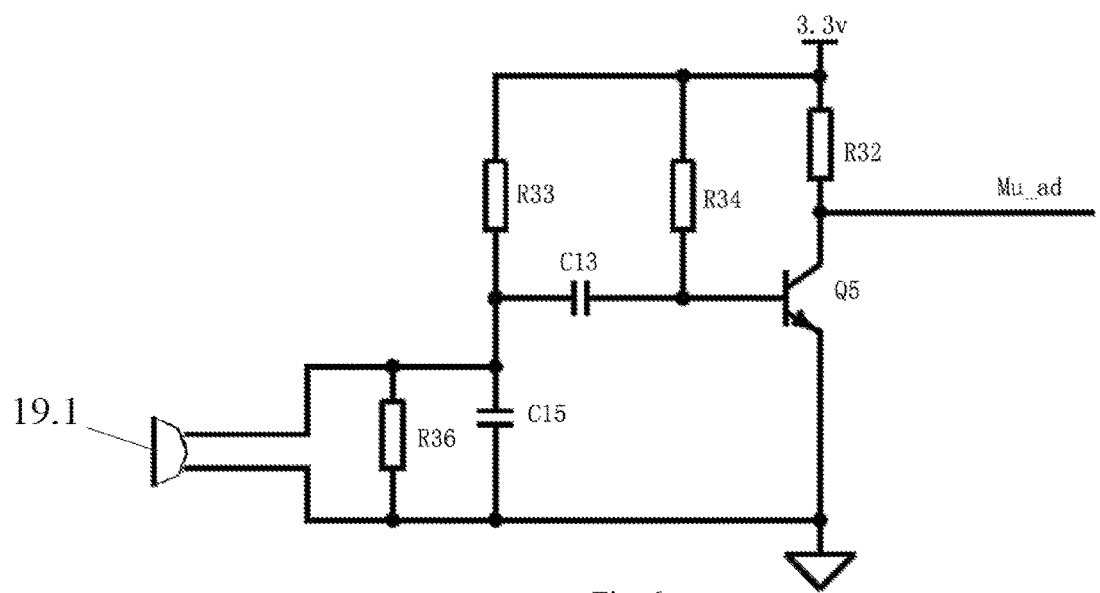
FIG. 6 is a circuit diagram of a microphone signal sampling module in the first embodiment.

As shown in FIGS. 1 to 6, the light emitting e-sports table of the present disclosure comprises a table top, a signal input device, a controller 13, a saving module 14 for saving last used light-emitting mode of a light-emitting device, a voltage conversion module 15 for power supply, Bluetooth module 16 used to provide a signal connection between an external remote controller and the controller 13, and light driver module 22, wherein the table top is provided with a light-emitting device, the input terminal of the controller 13 is respectively connected through signaling with the signal input device, the saving module 14 and Bluetooth of the module 16. The output terminal of the controller 13 is connected through signaling to the light-emitting device signal through the light driver module 22 to control the light-emitting device to emit light according to the signal input. The voltage conversion module 15 is connected to the controller 13 to supply power to the controller 13 and to supply power to the signal input device, the saving module 14, the light-emitting device, the light driver module 22, and the Bluetooth module 16 through the controller 13.

The signal input device of the present disclosure comprises audio signal sampling module 17, vibration sensing sampling module 18 and microphone signal sampling module 19. The present disclosure also comprises an external terminal module 20 for switching the signal input mode. The external terminal module 20 is connected to the audio signal sampling module 17 and the first input terminal 13.1 of the controller 13 respectively. The controller 13 blocks a signal input of the microphone signal sampling module 19 through detecting a signal of the external terminal module 20. The controller 13 blocks a signal input of the microphone signal sampling module 19 when detecting a signal of the external terminal module 20. At this time, the controller 13 detects the signal input of the audio signal sampling module 17 and/or the signal input of the vibration sensing sampling module 18, and controls the light-emitting device according to the signal input. In practical applications, the priority levels of the signal input of the audio signal sampling module 17 and the signal input of the vibration sensing sampling module 18 can be set in the programming of the controller 13 according to requirements. The controller 13 can control the light-emitting device according to the priority levels of signal input. When the signal input of the priority level is not detected, the light-emitting device is controlled according to the next received signal input. When the controller 13 does not detect the signal of the external terminal module 20, the controller 13 may control the light-emitting device according to the signal input of the detected microphone signal sampling module 19. In this way, the signal input mode may be switched, so that the e-sports players may select different signal input modes according to their preferences or needs to control the table top to emit light.

In this embodiment, the present disclosure set the signal input of the audio signal sampling module 17 as a priority signal through programming. When the controller 13 detects the signal of the external terminal module 20, the signal input of the microphone signal sampling module 19 is blocked. At this time, the controller 13 inputs the detected signal of the audio signal sampling module 17 to control the light-emitting device. The lighting frequency and lighting intensity etc. of a light-emitting mode of the light-emitting device may be changed according to the strength of the signal input of the audio signal sampling module, to produce responsive lighting. The e-sports table may combine lighting and music elements to produce an interactive effect. The e-sports table changes the lighting effect of the table top according to the rhythm and changes of the music rhythm, so that the e-sports players may also enjoy the lighting effect while listening to the music, which may satisfy the e-sports experience. If the controller 13 does not detect the signal input of the audio signal sampling module 17, it detects whether the signal input of vibration sensing sampling module 18 is received, and use the received signal input of vibration sensing sampling module 18 to control the light-emitting device. The lighting frequency and lighting intensity etc. of a light-emitting mode of the light-emitting device may be changed according to the size and frequency of the input of the vibration-sensing sampling module signal based on the magnitude and frequency of striking force against the table top, to produce responsive lighting.

When the controller 13 does not detect the signal of the external terminal module 20, the controller 13 controls the light-emitting device according to the detected signal input of the microphone signal sampling module 19. The lighting frequency and lighting intensity etc. of a light-emitting mode of the light-emitting device may be changed according to the signal input received by the microphone signal sampling module 19 based on the strength of external environment music or voice detected by a microphone, to produce responsive lighting. In this way, the signal input mode can be switched, so that the e-sports players may select different signal input modes according to their preferences or needs to control the table top to emit light.

Specifically, the audio signal sampling module 17 is formed by connecting an audio acquisition circuit, a control chip 21 connected to the controller 13, and a peripheral circuit. An output terminal of the control chip 21 is connected to the second input terminal 13.2 of the controller 13. The microphone signal sampling module 19 is formed by connecting a microphone 19.1, an amplifier circuit and a peripheral circuit. An output of the microphone signal sampling module 19 is connected to the fourth input terminal 13.4 of the controller 13. The vibration sensing sampling module 18 is formed by connecting a vibration sensor 18.1 for sensing table top vibration and a control chip 21 connected to the controller 13 and a peripheral circuit. An output terminal of the control chip 21 is connected to the third input terminal 13.3 of the controller 13. The vibration sensor 18.1 is connected to the table top.

In actual use, an one-to-two audio cable can be used to connect with the external terminal module 20 to provide the switching between the signal input of the audio signal sampling module 17 and the signal input of the microphone signal sampling module 19. If the audio cable is required to input audio, the male terminal of the one-to-two audio cable is connected to the external terminal module 20. The other male terminal is inserted into an audio output device (such as MP3, mobile phone, tablet, etc.). The female terminal can be connected to a speaker to play music. Controller 13 automatically switches to the mode to receive signal input of audio signal sampling module 17. If a microphone to input audio or voice is required, it is not necessary to connect the one-and-two audio cable to the external terminal module 20. The controller 13 will automatically switch to the mode to receive signal input of microphone signal sampling module 19.

The light-emitting device of the present disclosure utilizes a LED light strip 2 of a LED symphony light strip. The LED light strip 2 is connected to the controller 13 through the light driver module 22. The table top comprises a frame body 1, a light-transmitting plate 3, and a shielding plate 4 for preventing light leakage. Among them, the frame body 1 is provided with a reinforcement rod 7, and the shielding plate 4 is installed on the reinforcement rod 7 and is located inside the frame body 1. The light-transmitting plate 3 covers the upper end of the frame body 1. There is a space between the light-transmitting plate 3 and the shielding plate 4. The LED light strip 2 is provided on a side wall of the frame body 1 within the space. A light from the LED light strip 2 is directed toward the space and emitted through the light-transmitting plate 3.

The light-transmitting plate of the present disclosure is provided with a light-transmitting layer 3.1 and a screen printed light-shielding paint layer 3.2. A light of the LED light strip 2 is emitted from the light-transmitting layer 3.1. The light-transmitting layer 3.1 can be designed into different patterns and shapes according to actual requirements. The symphony light of the LED light strip 2 is emitted from the light-transmitting layer 3.1 to improve a cool effect of the e-sports table.

The present disclosure also comprises a power adapter 6 connected to the voltage conversion module 15 and an external remote controller. The voltage conversion module 15 is connected to the power grid through the power adapter 6. The controller 13, the saving module 14, the Bluetooth module 16, the audio signal sampling module 17, the vibration sensing sampling module 18, the microphone signal sampling module 19, the external terminal module 20, the control chip 21 and the light driver module 22 of the present disclosure are all integrated into the control unit 5. Control unit 5 is provided on frame body 1. The external remote control is connected to the controller 13 through the Bluetooth module 16. The external remote control may be a commonly used remote control on the market, or it can be a mobile phone, smart terminal or tablet with APP software installed. The external remote control uses the controller 13 to control remotely the on-off switch of the LED light strip 2, change the lighting color, and change the light-emitting mode.

The e-sports table of present disclosure also comprises a table leg 8 and a base 9. The table leg 8 is connected to the frame body 1. The base 9 is connected to an end of the table leg 8 away from the frame body 1. The bottom of the base 9 is provided with an adjustable leg 10 for adjusting the height of the table top. The present disclosure also comprises a headphone holder 11 and a cup holder 12, wherein both the headphone holder 11 and the cup holder 12 are connected to the frame body 1.

SECOND EMBODIMENT

This embodiment differs from the first embodiment only in that: The signal input device comprises an audio signal sampling module and a microphone signal sampling module. The external terminal module is connected to the audio signal sampling module and the first input terminal of the controller respectively. The controller blocks a signal input of the microphone signal sampling module through detecting a signal of the external terminal module. The controller blocks a signal input of the microphone signal sampling module when detecting a signal of the external terminal module. At this time, the controller detects a signal input of the audio signal sampling module and controls the light-emitting device according to the signal input.

When the controller does not detect a signal of the external port module, the controller will control the light-emitting device according to the signal input of the microphone signal sampling module.

In this way, the signal input mode can be switched, so that the e-sports players may select different signal input modes according to their preferences or needs to control the table top to emit light.

The other structures of this embodiment are the same as those of the first embodiment.

THIRD EMBODIMENT

This embodiment differs from the first embodiment only in that: The signal input device comprises a vibration sensing sampling module and a microphone signal sampling module. The external terminal module is connected to the vibration sensing sampling module and the controller respectively. The controller blocks a signal input of the microphone signal sampling module through detecting a signal of the external terminal module. The controller blocks a signal input of the microphone signal sampling module when detecting a signal of the external terminal module. At this time, the controller detects a signal input of the vibration sensing sampling module and controls the light-emitting device according to the signal input.

When the controller does not detect a signal of the external port module, the controller will control the light-emitting device according to the signal input of the microphone signal sampling module.

In this way, the signal input mode can be switched, so that the e-sports players may select different signal input modes according to their preferences or needs to control the table top to emit light.

The other structures of this embodiment are the same as those of the first embodiment.

FOURTH EMBODIMENT

This embodiment differs from the first embodiment only in that: the external terminal module is not present. The signal input device comprises an audio signal sampling module, a vibration sensing sampling module, or a microphone signal sampling module. When the controller detects the signal input of the audio signal sampling module, the signal input of the vibration sensing sampling module or the signal input of the microphone signal sampling module, the light-emitting device is controlled according to the corresponding signal input.

The other structures of this embodiment are the same as those of the first embodiment.

FIFTH EMBODIMENT

This embodiment differs from the first embodiment only in that the structure of the e-sports table is different.

Figure 7:
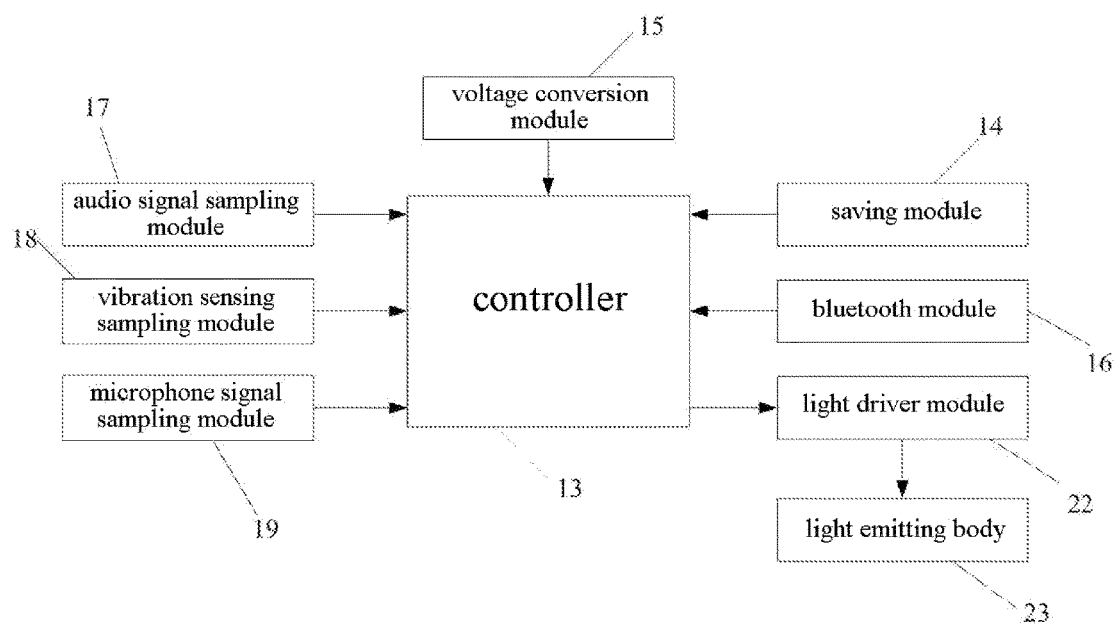
FIG. 7 is an illustrative diagram of modules of the e-sports table in the fifth embodiment.
Figure 8:
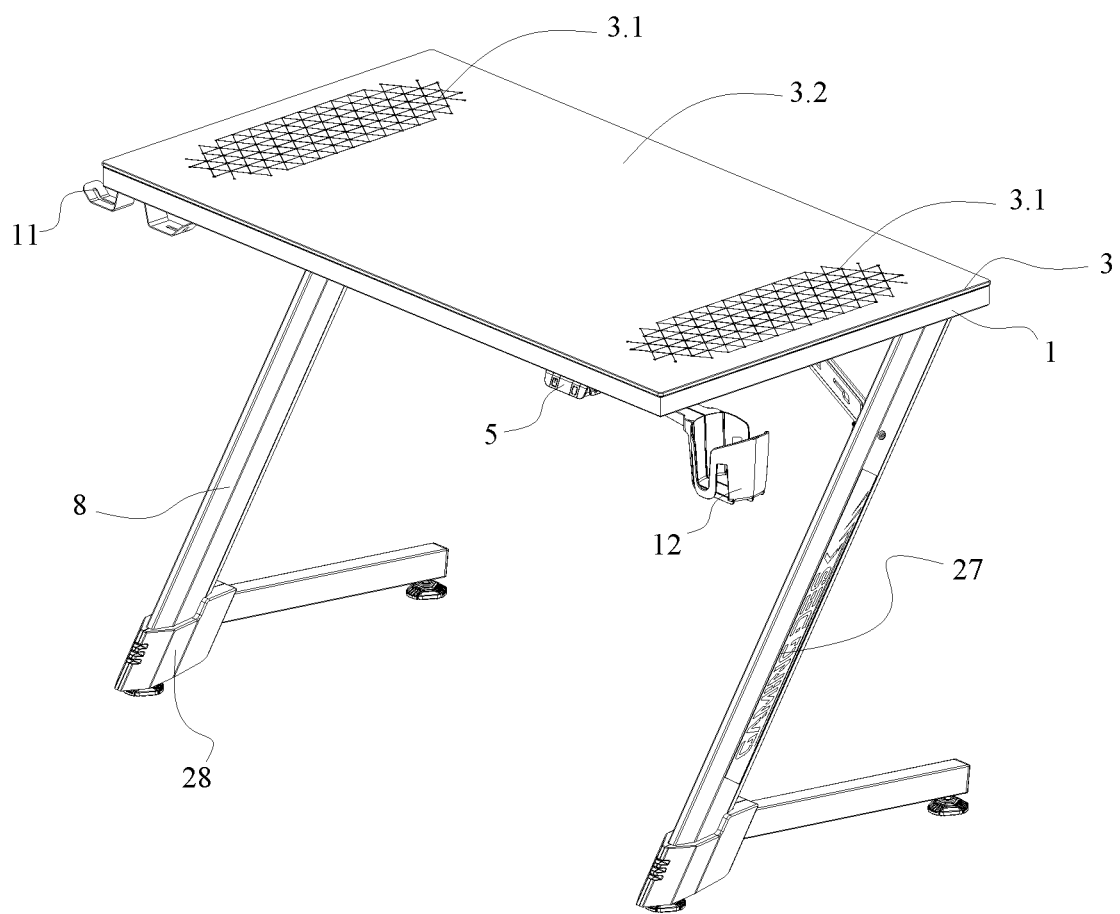
FIG. 8 is an illustrative diagram of the e-sports table in the fifth embodiment.
Figure 9:
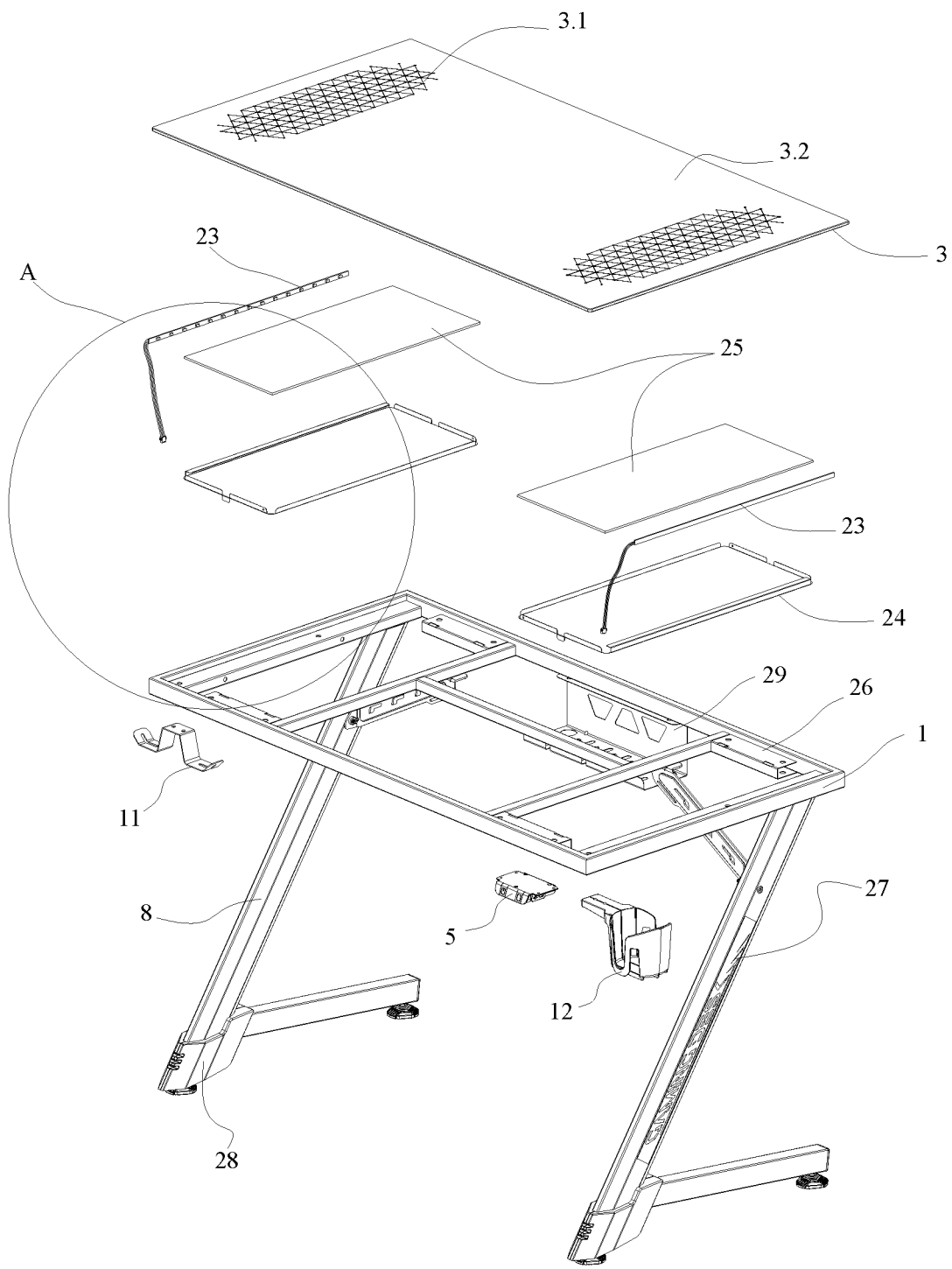
FIG. 9 is an exploded view of the e-sports table in the fifth embodiment.
Figure 10:
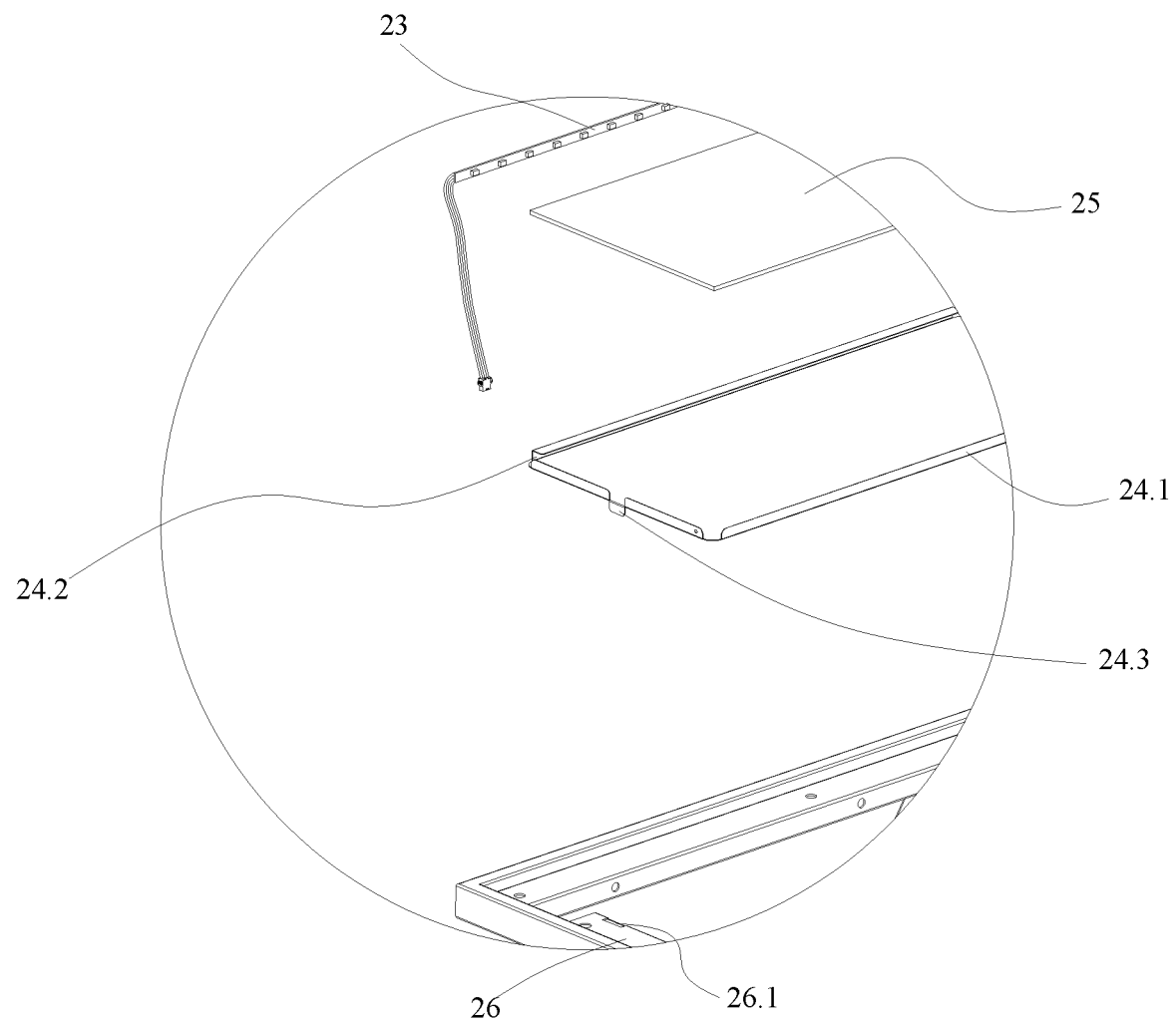
FIG. 10 is an enlarged view at A in FIG. 9.

As shown in FIGS. 7 to 10, the table top of this embodiment comprises a frame body 1, two light-emitting devices, a light-transmitting plate 3, and two mounting racks 24 for mounting the light-emitting devices. The mounting racks 24 are detachably connected to the frame body 1 and are provided inside the frame body 1. The light-transmitting plate 3 covers the upper end of the frame body 1. The light-emitting devices are mounted and fixed on the mounting racks 24, and their light are emitted from the light-transmitting plate 3.

The light-emitting device of the present disclosure comprises a light-emitting body 23 and a light guide plate 25 both mounted on a mounting rack 24, wherein the light-emitting surface of the light-emitting body 23 faces the light guide plate 25, and the light of the light-emitting body 23 is emitted from the light-transmitting plate 3 through the light guide plate 25.

The mounting rack 24 of the present disclosure comprises a frame 24.1. The side of the frame 24.1 is provided with a mounting groove 24.2. The light guide plate 25 is mounted on the frame 24.1. The light-emitting body 23 is inserted into the mounting groove 24.2, and the light emitting surface faces the light guide plate 25. In addition, the frame body 1 is provided with a mounting seat 26 with an insertion hole 26.1, and the bottom of the frame 24.1 is provided with an insertion piece 24.3. The mounting rack 24 is detachably connected to the frame body 1 through insertion hole 26.1 and insertion piece 24.3. When the light-emitting body 23 or the light guide plate 25 needs to be replaced or repaired, the mounting rack 24 may be directly removed. The mounting frame 24 is cleverly designed to mount and fix in place the light guide plate 25 and the light-emitting body 23 at the same time, so that the light emitting device is mounted as an integrated module to facilitate overall mounting and dismounting.

The present disclosure also comprises a power adapter (not shown) connected to the voltage conversion module 15 and an external remote control. The voltage conversion module 15 is connected to the power grid through the power adapter. The controller 13, saving module 14, Bluetooth module 16, audio signal sampling module 17, vibration sensing sampling module 18, microphone signal sampling module 19, external terminal module, control chip and light driver module 22 of the present disclosure are all integrated into the control unit 5. The control unit 5 is provided on the frame body 1. The light driver module 22 in the control unit 5 is connected to the light-emitting body 23. The external remote control is connected to the controller 13 through the Bluetooth module 16. The external remote control can be a commonly used remote control on the market, or it can be an APP software on the mobile phone and smart terminal tablet. The external remote control controls remotely the on-off switch of the light-emitting body 23, change the lighting color, and change the light-emitting mode through controller 13.

The light-transmitting plate 3 of the present disclosure is provided with a light-transmitting layer 3.1 and a light-blocking paint layer 3.2. The light-transmitting layer 3.1 is located above the light-emitting device, and the light of the light-emitting device is emitted from the light-transmitting layer. The light-transmitting plate 3 is screen printed with a light-blocking paint layer 3.2, so that the light of the light-emitting device is all emitted from the light-transmitting layer 3.1. The light-transmitting layer 3.1 can be designed into different patterns and shapes according to actual needs. The number of light-transmitting layer 3.1 may be equal to the number of light-emitting devices, and the symphony lights of the light-emitting body 23 are emitted from the light-transmitting layer 3.1 to improve the cool effect of the e-sports table.

The e-sports table of the present disclosure also comprises a table leg 9 connected to the frame body 1. In order to increase the uniqueness and beauty of the e-sports table, the table leg 9 is also provided with a decorative layer 27 and a decorative cover 28. The decorative cover 27 is a sticker with a pattern, painted or screen printed with various patterns, or provided with engraved patterns. This design further improves the cool effect of the e-sports table.

The present disclosure also comprises a cable organizer 29, which is connected to the bottom of the frame body 1 and is provided with a through hole for facilitating wire routing. The cable organizer 29 has two functions: one is to provide through holes for easy wiring, and the other is that the cable organizer 29 may provide a counterweight role.

The present disclosure also comprises an earphone holder 11 and a cup holder 12. The earphone holder 11 and the cup holder 12 are both connected to the frame body 1.

The other structures of this embodiment are the same as those of the first embodiment.

SIXTH EMBODIMENT

This embodiment differs from the fifth embodiment only in that one, three, or more than three light-emitting devices are provided, and the number of mounting racks and the number of light-transmitting layers of the light-transmitting plate may be equal to the number of light-emitting devices.

The other structures of this embodiment are the same as those of the fifth embodiment.

SEVENTH EMBODIMENT

This embodiment differs from the first embodiment only in that: the LED light strip is provided on the shielding plate and is provided in the space. A light emitted by the LED light strip is directed toward the space and is emitted through the light-transmitting plate.

The other structures of this embodiment are the same as those of the first embodiment.

The above embodiments are preferred embodiments of the present disclosure, but the embodiments of the present disclosure are not limited by the above embodiments. Any other changes, modifications, substitutions, combinations, simplifications, made without departing from the spirit and principle of the present disclosure, should be equivalent replacement methods, and all included in the protection scope of the present disclosure.

The invention claimed is:

1. A light-emitting table, comprising a table top; a signal input device for receiving an signal input; and a controller;
    wherein the table top is provided with a light-emitting device; an input of the controller is connected with the signal input device; an output of the controller is in communication with the light-emitting device though signaling; and the light-emitting device is controlled to emit light based on the signal input;
    wherein the signal input device is in one of the following forms:
        (a) the signal input device comprises an audio signal sampling module, a vibration sensing sampling module and a microphone signal sampling module;
        (b) the signal input device comprises an audio signal sampling module, a vibration sensing sampling module or a microphone signal sampling module;
        (c) the signal input device comprises an audio signal sampling module and a microphone signal sampling module; or the signal input device comprises a vibration sensing sampling module and a microphone signal sampling module;

(d) the signal input device comprises an audio signal sampling module and a vibration induction sampling module; and wherein the light-emitting table further comprises an external terminal module for switching a signal input mode;

when the signal input device is in form (a), the external terminal module is respectively connected to the audio signal sampling module and the controller;

when the signal input device is in form (c), the external terminal module is respectively connected to the vibration sensing sampling module and the controller;

the controller blocks a signal input of the microphone signal sampling module when detecting a signal of the external terminal module, and the microphone signal sampling module comprises a microphone, an amplifier circuit and a peripheral circuit.

2. The light-emitting table according to claim 1, further comprising a saving module for saving a last used light-emitting mode of the light-emitting device; and a voltage conversion module for supplying power; wherein an input of the saving module is connected with the input of the controller; and the voltage conversion module is connected to the controller.

3. The light-emitting table according to claim 1, further comprising a Bluetooth module for a signal connection between an external remote controller and the controller; the Bluetooth module is connected to the input of the controller; wherein the external remote control is a mobile phone, a tablet or a smart terminal.

4. The light-emitting table according to claim 1, wherein the vibration sensing sampling module comprises a vibration sensor for sensing a vibration of the table top, a control chip connected to the controller, and a peripheral circuit; and the vibration sensor is connected to the table top.

5. The light-emitting table according to claim 1, wherein the audio signal sampling module comprises an audio acquisition circuit, a control chip connected to the controller, and a peripheral circuit.

6. The light-emitting table according to claim 1, wherein the table top comprises a frame body, a light-transmitting plate, and a shielding plate for preventing light leakage; the shielding plate is provided inside the frame body; the light-transmitting plate covers an upper end of the frame body; a space is provided between the light-transmitting plate and the shielding plate; the light-emitting device is provided within the space, and a light of the light-emitting device is emitted through the light-transmitting plate.

7. The light-emitting table according to claim 1, wherein the table top comprises a frame body, at least one light-emitting device, a light-transmitting plate, and at least one mounting rack for mounting the at least one light-emitting device;

wherein the number of the at least one mounting rack is the same with the number of the at least one light-emitting device; the at least one mounting rack is detachably connected to the frame body and is located inside the frame body; the light-transmitting plate covers an upper end of the frame body; each of the at least one light-emitting device is mounted on one of the at least one mounting rack; and a light of the light-emitting device is emitted through the light-transmitting plate.

8. A device for controlling light-emitting of a table top, comprising:

a signal inputting/sensing device;

a light-emitting device set on the table top; and a controller having a input terminal connecting with the signal inputting/sensing device and a output terminal in communication with the light-emitting device though signaling for controlling the light-emitting device to emit light based on an input signal;

wherein the signal inputting/sensing device is in one of the following forms:

a) the signal inputting/sensing device comprises an audio signal sampling module, a vibration sensing sampling module and a microphone signal sampling module;

b) the signal inputting/sensing device comprises an audio signal sampling module, a vibration sensing sampling module or a microphone signal sampling module;

c) the signal inputting/sensing device comprises an audio signal sampling module and a microphone signal sampling module; or the signal inputting/sensing device comprises a vibration sensing sampling module and a microphone signal sampling module; and d) the signal inputting/sensing device comprises an audio signal sampling module and a vibration induction sampling module; and wherein the device further comprises an external terminal module for switching a signal input mode;

when the signal inputting/sensing device is in form (a), the external terminal module is respectively connected to the audio signal sampling module and the controller;

when the signal inputting/sensing device is in form (c), the external terminal module is respectively connected to the vibration sensing sampling module and the controller; and the controller blocks a signal input of the microphone signal sampling module by detecting a signal of the external terminal module, and the microphone signal sampling module comprises a microphone, an amplifier circuit and a peripheral circuit.

9. The device according to claim 8, further comprising a saving module for saving a last used light-emitting mode of the light-emitting device; and a voltage conversion module for supplying power; wherein the saving module is connected with the input terminal of the controller; and the voltage conversion module is connected to the controller.

10. The device according to claim 8, further comprising a Bluetooth module for a signal connection between an external remote controller and the controller, wherein the Bluetooth module is connected to the input terminal of the controller; and wherein the external remote controller is a mobile phone, a tablet or a smart terminal.

11. The device according to claim 8, wherein the vibration sensing sampling module comprises a vibration sensor for sensing a vibration of the table top, a control chip connected to the controller, and a peripheral circuit; and the vibration sensor is connected to the table top.

12. The device according to claim 8, wherein the audio signal sampling module comprises an audio acquisition circuit, a control chip connected to the controller, and a peripheral circuit.

* * * * *